US007003175B2

(12) United States Patent
Paladini

(10) Patent No.: US 7,003,175 B2
(45) Date of Patent: Feb. 21, 2006

(54) OBJECT-ORDER MULTI-PLANAR REFORMATTING

(75) Inventor: Gianluca Paladini, Princeton, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 597 days.

(21) Appl. No.: 10/103,322

(22) Filed: Mar. 21, 2002

(65) Prior Publication Data
US 2003/0055328 A1  Mar. 20, 2003

Related U.S. Application Data

(60) Provisional application No. 60/279,253, filed on Mar. 28, 2001.

(51) Int. Cl.
*G06K 9/36* (2006.01)
*G06T 17/00* (2006.01)
(52) U.S. Cl. ............... 382/276; 382/154; 382/300; 345/424
(58) Field of Classification Search ........ 382/128, 382/131, 154, 171, 282, 284, 294, 173, 276, 382/293, 300; 345/419, 424
See application file for complete search history.

(56) References Cited

U.S. PATENT DOCUMENTS

| 4,586,038 | A  | * | 4/1986  | Sims et al. ............. 345/586 |
| 4,737,921 | A  | * | 4/1988  | Goldwasser et al. ..... 345/421 |
| 4,984,157 | A  | * | 1/1991  | Cline et al. ............ 345/424 |
| 6,048,312 | A  | * | 4/2000  | Ishrak et al. ........... 600/443 |
| 6,167,296 | A  | * | 12/2000 | Shahidi ................... 600/427 |
| 6,178,220 | B1 | * | 1/2001  | Freundlich et al. ......... 378/4 |
| 6,283,918 | B1 | * | 9/2001  | Kanda et al. ........... 600/441 |
| 6,680,735 | B1 | * | 1/2004  | Seiler et al. ............ 345/424 |

OTHER PUBLICATIONS

G. Herman and H. Liu, "Display of three-dimensional information in computed tomography", Journal of Computer Assisted Tomography, 1:155-160, 1977.

M. Rhodes, W. Glenn, Jr. and V. Azzawi, "Extracting oblique planes from serial CT section," Journal of Computer Assisted Tomography, 4:649-657, 1980.

J. D. Foley, A. Van Dam, "Fundamentals of Interactive Computer Graphics," Addison-Wesley Publishing Co., Reading, MA, Chapter 7, pp. 255-261, Jul. 1984.

* cited by examiner

*Primary Examiner*—Daniel Miriam
(74) *Attorney, Agent, or Firm*—Donald B. Paschburg; Frank Chau & Associates, LLP

(57) ABSTRACT

A system and method for object-order reformatting of a volume having data slices includes a coordinate transformation unit for transforming coordinates of an oblique surface through the volume from image-order to object-order, an object-order slice traversal unit for traversing the slices in accordance with the object-order of the transformed coordinates, and a slice-pair interpolation unit for interpolating voxel values of a pair of adjacent slices to render pixel values for an image of the oblique plane.

20 Claims, 5 Drawing Sheets

US 7,003,175 B2

OBJECT-ORDER MULTI-PLANAR REFORMATTING

This application claims benefit of provisional application 60/279,253, filed Mar. 28, 2001.

BACKGROUND

The computing of planar oblique cross-sections from a three-dimensional array of data is commonly referred to as multi-planar reformatting ("MPR"). The data used for MPR images can be obtained from medical tomographic scanners such as, for example, magnetic resonance ("MR"), computed tomography ("CT"), positron emission tomography ("PET"), or other apparatus capable of producing a series of slices in a grid-like array.

Technological advances in the field of tomographic imaging have greatly improved the spatial resolution and speed of data acquisition, resulting in the production of very large datasets composed of hundreds, and even thousands, of slices. For example, it is possible to rapidly generate a sequence of 1024 slices using the Siemens SOMATOM VolumeZoom™ CT scanner, with each slice having a grid of 512×512 picture elements, resulting in a three-dimensional volume of 512×512×1024 volume elements for a total of over 268 million data values.

In an oil and gas industry example, seismic data measurements are also stored in very large three-dimensional volumes with as many as 2048×2048×2048 grid elements for a total of over 8.5 billion data values. Such an enormous amount of data is often larger than the random-access memory ("RAM") storage available on many modern computers. Some three-dimensional arrays can be so large that their size exceeds the memory addressing capability of 32-bit central processing units ("CPU"s) found in many personal computers and graphics workstations, which CPUs may be limited to addressing a maximum of 4.2 billion data elements.

MPR has heretofor been implemented as an image-order technique, where the pixel locations of the cross-sectional image are generated and traversed sequentially, transformed in the coordinate system of the volume data, and interpolated over a data neighborhood of the three-dimensional array. Thus, one limitation of current MPR methods is that they require random access to the data values of the three-dimensional array, and therefore the entire array needs to be stored in the computer's RAM. In order to compute MPR images of very large volumes, a costly apparatus with very large amounts of RAM is typically needed.

Another limitation of current methods is that when using a 32-bit CPU, for example, the size of the three-dimensional array used for MPR is limited to the maximum number of data elements addressable by the CPU. Thus, a need exists to remove these limitations in order to permit an apparatus and/or programmed computer having a limited amount of memory to compute MPR cross-sectional images of very large three-dimensional arrays, which arrays may be composed of an arbitrarily large number of slices.

SUMMARY

These and other drawbacks and disadvantages of the prior art are addressed by a system and method for object-order reformatting of a volume having data slices that includes a coordinate transformation unit for transforming coordinates of an oblique surface through the volume from image-order to object-order, an object-order slice traversal unit for traversing the slices in accordance with the object-order of the transformed coordinates, and a slice-pair interpolation unit for interpolating voxel values of a pair of adjacent slices to render pixel values for an image of the oblique plane.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a memory-efficient approach to object-order reformatting of large volumes in accordance with the following exemplary figures, in which.

DETAILED DESCRIPTION OF PREFERRED EMBODIMENTS

A system and method are disclosed for computing an image of an oblique cross-section from a three-dimensional volume object composed of a series of parallel slices, where the order of processing is based on the progressive traversal of slices in the three-dimensional volume object (i.e., "object-order") rather than being based on the progressive traversal of pixels in the computed multi-planar reformatted image (i.e., "image-order").

The series of parallel slices contains data values representing the interior of a three-dimensional volume, such as, for example, data from magnetic resonance ("MR") scanners. The orientation of the oblique cross-section is specified as a transform composed of rotation, translation, shear, and scaling with respect to a chosen coordinate system.

The transformed coordinates of the pixels in the cross-sectional image are computed incrementally and sorted according to the progressive slice order of the volume. The sorted coordinates are then traversed and pixel values of the MPR image are interpolated from the corresponding neighborhood of data values in data space.

Figure 1:
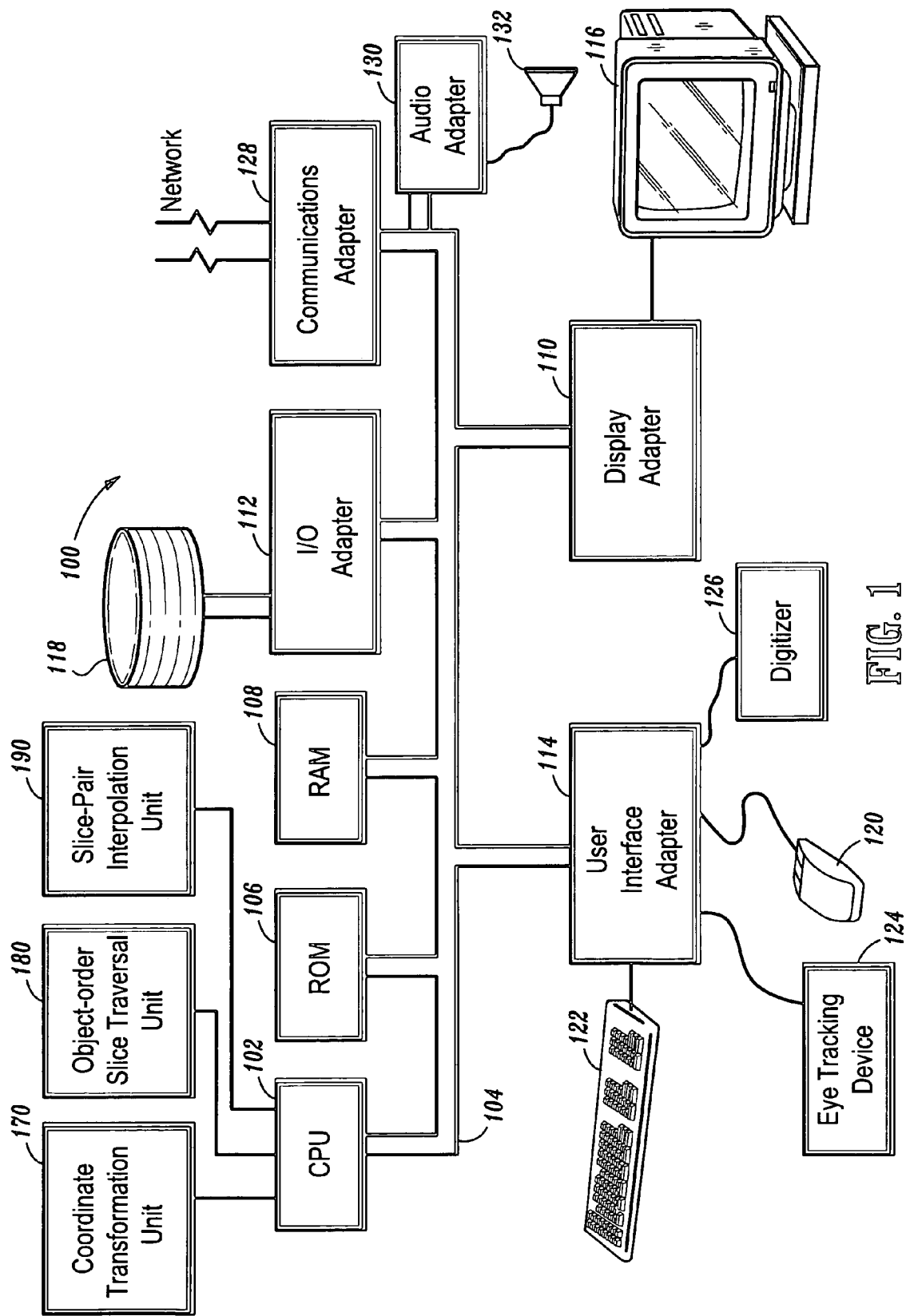
FIG. 1 shows a block diagram of a system for object-order reformatting of large volumes according to an illustrative embodiment of the present disclosure.

FIG. 1 shows a block diagram of a system 100 for object-order reformatting of large volumes according to an illustrative embodiment of the present disclosure. The system 100 includes at least one processor or central processing unit ("CPU") 102 in signal communication with a system bus 104. A read only memory ("ROM") 106, a random access memory ("RAM") 108, a display adapter 110, an I/O adapter 112, and a user interface adapter 114 are also in signal communication with the system bus 104.

A display unit 116 is in signal communication with the system bus 104 via the display adapter 110. A disk storage unit 118, such as, for example, a magnetic or optical disk storage unit, is in signal communication with the system bus 104 via the I/O adapter 112. A mouse 120, a keyboard 122, and an eye tracking device 124 are also in signal communication with the system bus 104 via the user interface adapter 114. The mouse 120, keyboard 122, and eye-tracking device 124 are used to aid in the generation of selected regions in an image.

A coordinate transformation unit 170, an object-order slice traversal unit 180 and a slice-pair interpolation unit 190 are also included in the system 100 and in signal communication with the CPU 102 and the system bus 104. While the coordinate transformation unit 170, the object-order slice traversal unit 180 and the slice-pair interpolation unit 190 are illustrated as coupled to the at least one processor or CPU 102, these components are preferably embodied in computer program code stored in at least one of the memories 106,108 and 118, wherein the computer program code is executed by the CPU 102.

The system 100 may also include a digitizer 126 in signal communication with the system bus 104 via a user interface adapter 114 for digitizing an image slice. Alternatively, the digitizer 126 may be omitted, in which case digital image slices may be input to the system 100 from a network via a communications adapter 128 in signal communication with the system bus 104, or via other suitable means as understood by those skilled in the art.

As will be recognized by those of ordinary skill in the pertinent art based on the teachings herein, alternate embodiments are possible, such as, for example, embodying some or all of the computer program code in registers located on the processor chip 102. Given the teachings of the disclosure provided herein, those of ordinary skill in the pertinent art will contemplate various alternate configurations and implementations of the coordinate transformation unit 170, the object-order slice traversal unit 180 and the slice-pair interpolation unit 190, as well as the other elements of the system 100, while practicing within the scope and spirit of the present disclosure.

Figure 2A:
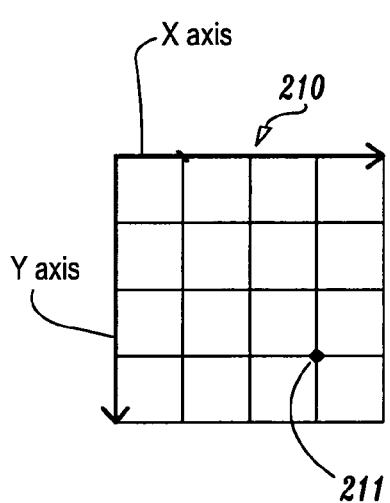
FIG. 2a shows a schematic slice comprising a two-dimensional grid of picture elements ("pixels")
Figure 2B:
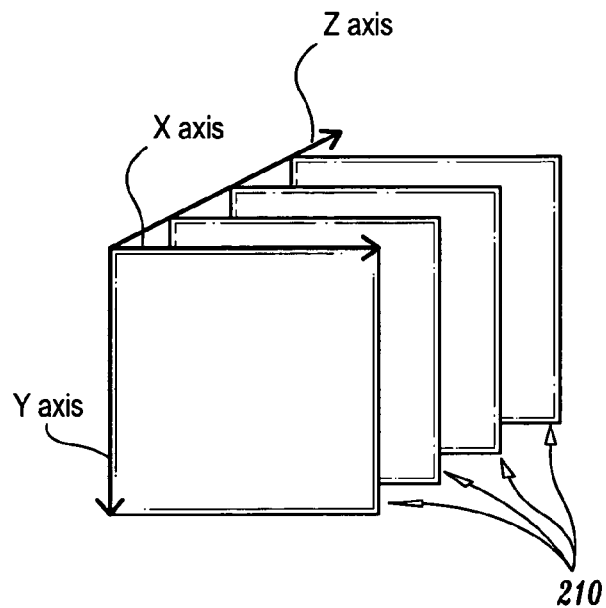
FIG. 2b shows a schematic series of slices of FIG. 2a arranged in sequential order.
Figure 2C:
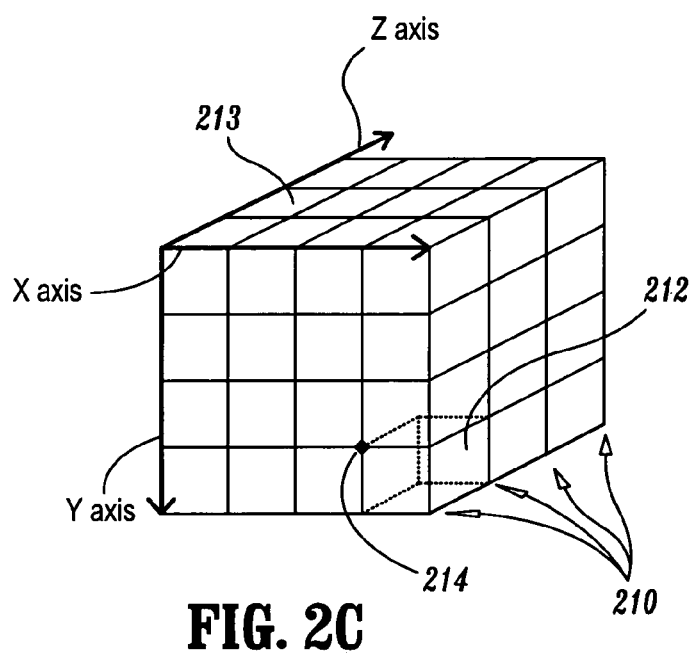
FIG. 2c shows a schematic volume formed from the series of slices of FIG. 2b comprising a three-dimensional grid of volume elements ("voxels")
Figure 2D:
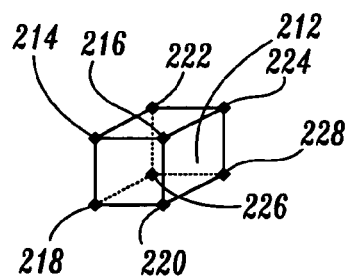
FIG. 2d shows a schematic neighborhood of 8 adjacent voxels.

Turning to FIGS. 2a through 2d, a slice composed of a two-dimensional grid of picture elements ("pixels") is indicated generally by the reference numeral 210, and an (x,y) pixel 211 is shown in FIG. 2a. A Z-axis sequence of image slices 210 is illustrated in FIG. 2b. A 3-dimensional volume 213 comprising the image slices 210 and a voxel neighborhood 212 is shown in FIG. 2c, along with a representative voxel value 214. The voxel neighborhood 212 and eight adjacent voxel values 214 through 228 are shown in FIG. 2d.

Figure 3A:
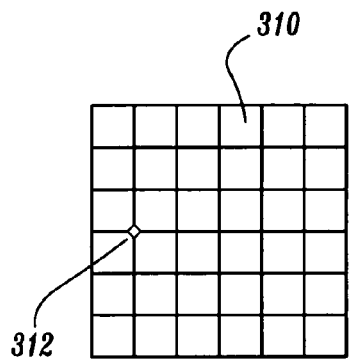
FIG. 3a shows a schematic multi-planar reformatting ("MPR") image and its two-dimensional pixel coordinates.
Figure 3B:
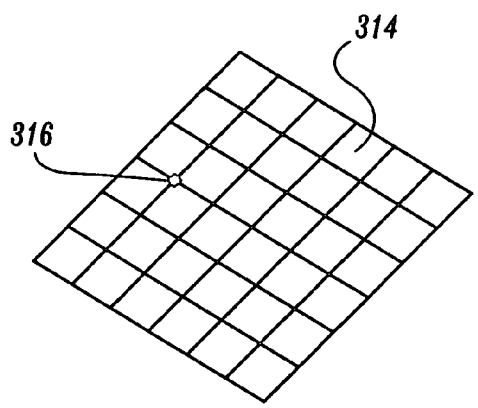
FIG. 3b shows a schematic transformed MPR plane of FIG. 3a and its three-dimensional pixel coordinates.
Figure 3C:
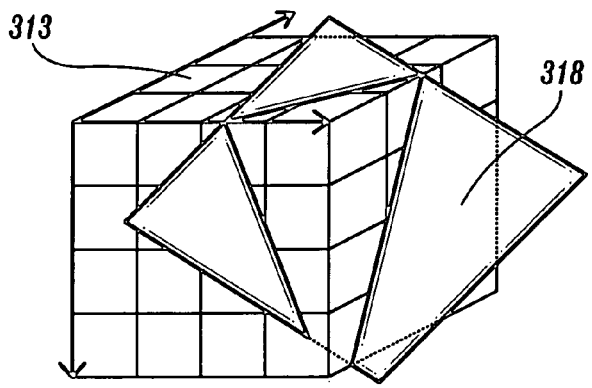
FIG. 3c shows the schematic MPR plane of FIG. 3b positioned through a volume in order to compute the MPR image of an oblique cross-section.

FIG. 3a illustrates an MPR image 310 having a two-dimensional (x,y) pixel coordinate 312. FIG. 3b illustrates a transformed MPR plane 314 having a three-dimensional (x,y,z) pixel coordinate 316. FIG. 3c illustrates an MPR plane oblique cross-section 318 positioned through a volume 313 in order to compute the MPR image of the oblique cross-section 318.

Figure 4:
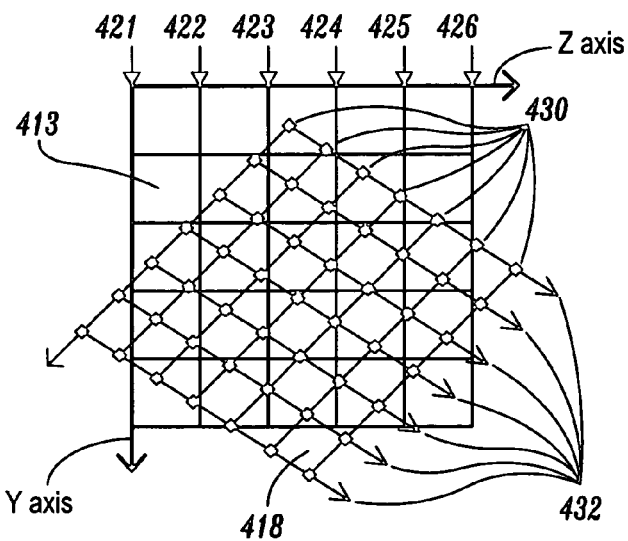
FIG. 4 shows a schematic three-dimensional volume as seen from its x-axis, the position of the series of slices in such volume, an oblique cross-section through such volume, and the position of samples along scan lines of such oblique cross-section.

FIG. 4 illustrates a three-dimensional volume 413 as seen from its X-axis, the positions of the series of slices 421 through 426 in the volume, an oblique cross-section 418 through the volume, and the positions of samples 430 along each scan line 432 of the oblique cross-section 418. For illustrative purposes only, seven samples 430 are shown along each of seven scan lines 432.

Figure 5:
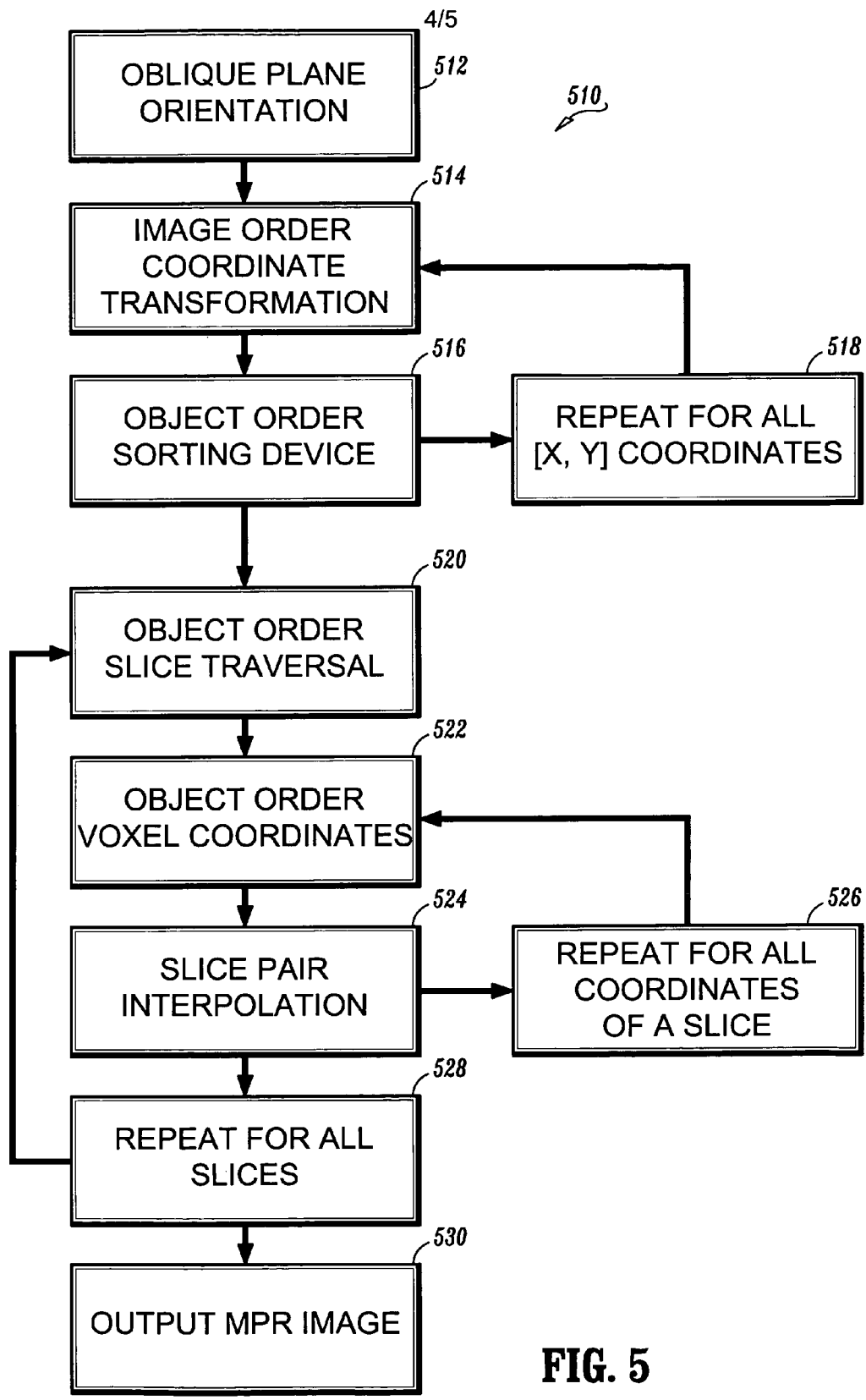
FIG. 5 shows a block flow diagram of the object-order MPR method.

Turning now to FIG. 5, a block flow diagram of the object-order MPR method is indicated generally by the reference numeral 510. Function block 512 performs oblique plane orientation and passes control to function block 514. Block 514 performs image-order coordinate transformation and passes control to function block 516. Block 516 performs object-order sorting, and passes to function block 518 if any (x,y) coordinates remain, or to function block 520 if all coordinates have been sorted. Block 518 passes control back to block 514 for each (x,y) coordinate.

Block 520 performs object-order slice traversal and passes control to function block 522, which computes object-order voxel coordinates and passes control to function block 524. Block 524, in turn, performs slice-pair interpolation, and passes control to function block 526 if any coordinates remain for the current slice, or to function block 528 to process the next slice. Block 526 passes control back to block 522 for each coordinate of the current slice. Block 528 passes control back to block 520 to perform object-order slice traversal for each remaining slice, or to function block 530 if all slices have been traversed. Function block 530 outputs the MPR image as determined by the object-order technique.

Figure 6A:
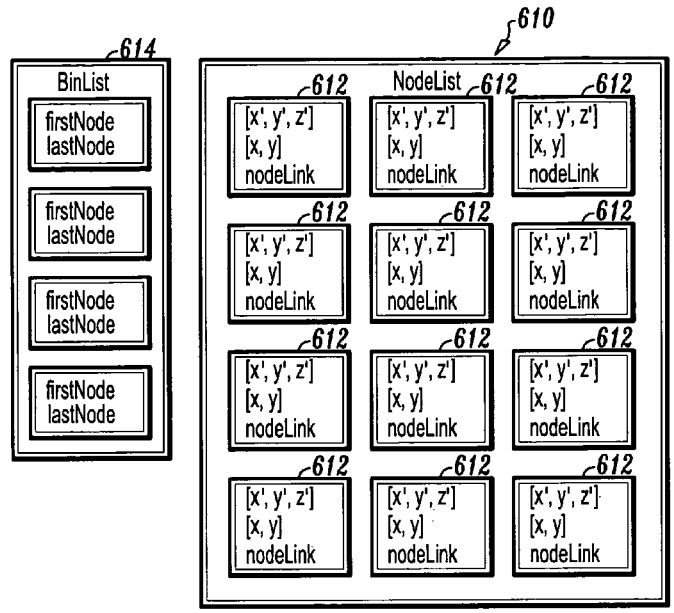
FIG. 6a shows an exemplary list of unsorted elements.
Figure 6B:
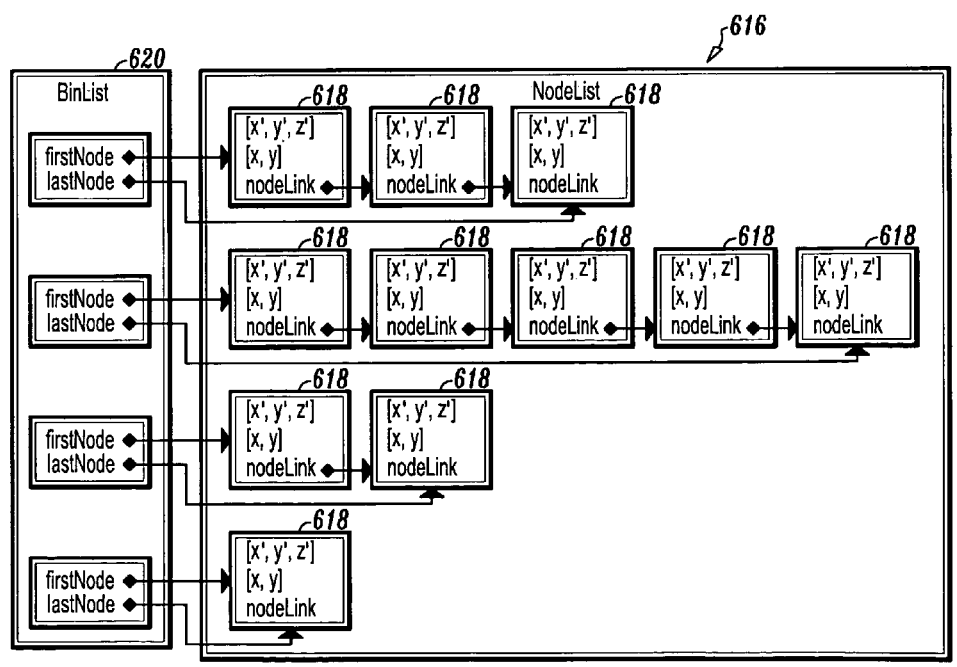
FIG. 6b shows an exemplary list of sorted linked-list elements.

FIGS. 6a and 6b illustrate the data structures used in a preferred embodiment. FIG. 6a shows an exemplary unsorted list 610 of unsorted elements 612 and a corresponding pointer array 614. FIG. 6b shows an exemplary sorted linked-list 616 of sorted elements 618 and a corresponding pointer array 620.

In typical operation, data acquisition includes assembling a three-dimensional volume array of data from a regular succession of adjacent "slices" through the object being scanned, where each slice is a two-dimensional image array of data points. The derivation of such three-dimensional volume array is well known in the art and readily obtainable using systems such as magnetic resonance ("MR") imaging systems, computed tomography ("CT") scanning systems, positron emission tomography ("PET"), and ultrasound scanning. Each grid value of a two-dimensional image array is called a picture element, or "pixel". Each grid value of a three-dimensional volume array is called a volume element, or "voxel".

An oblique cut plane is positioned with respect to the three-dimensional volume array according to the desired orientation of the cross-sectional view to be displayed, such as by using an affine transformation matrix M of the following form:

$$M = \begin{bmatrix} xu & xv & xw & 0 \\ yu & yv & yw & 0 \\ zu & zv & zw & 0 \\ tu & tv & tw & 1 \end{bmatrix} \quad (1)$$

Such affine transformation matrix represents a combination of rotation, scaling, shear and translation operations, and can be computed using many different techniques. Without loss of generality, one possible form of M is a forward projection matrix $M_{fwd}$, computed as a combination of several transformations:

$$M_{fwd}=T(Dx,Dy,Dz)\cdot R(\alpha,\beta,\gamma)\cdot S(Sx,Sy,Sz)\cdot G(\Phi,\theta) \quad (2)$$

where T is a translation matrix, R is a rotation matrix, S is a scaling matrix, and G is a gantry tilt ("shear") matrix in the following form:

$$T(Dx, Dy, Dz) = \begin{bmatrix} 1 & 0 & 0 & 0 \\ 0 & 1 & 0 & 0 \\ 0 & 0 & 1 & 0 \\ Dx & Dy & Dz & 1 \end{bmatrix} \quad (3)$$

$$S(Sx, Sy, Sz) = \begin{bmatrix} Sx & 0 & 0 & 0 \\ 0 & Sy & 0 & 0 \\ 0 & 0 & Sz & 0 \\ 0 & 0 & 0 & 1 \end{bmatrix} \quad (4)$$

$$Rx(\alpha) = \begin{bmatrix} 1 & 0 & 0 & 0 \\ 0 & \cos\alpha & \sin\alpha & 0 \\ 0 & -\sin\alpha & \cos\alpha & 0 \\ 0 & 0 & 0 & 1 \end{bmatrix}$$

$$Ry(\beta) = \begin{bmatrix} \cos\beta & 0 & -\sin\beta & 0 \\ 0 & 1 & 0 & 0 \\ \sin\beta & 0 & \cos\beta & 0 \\ 0 & 0 & 0 & 1 \end{bmatrix}$$

$$Rz(\gamma) = \begin{bmatrix} \cos\gamma & \sin\gamma & 0 & 0 \\ -\sin\gamma & \cos\gamma & 0 & 0 \\ 0 & 0 & 1 & 0 \\ 0 & 0 & 0 & 1 \end{bmatrix}$$

$$R(\alpha, \beta, \gamma) = Rz(\gamma)\cdot Ry(\beta)\cdot Rx(\alpha) \quad (5)$$

$$G(\phi, \theta) = \begin{bmatrix} 1 & 0 & 0 & 0 \\ 0 & 1 & 0 & 0 \\ \tan(-\varphi) & \tan(-\theta) & 1 & 0 \\ 0 & 0 & 0 & 1 \end{bmatrix} \quad (6)$$

where (Dx, Dy, Dz) are translation coefficients, (Sx, Sy, Sz) are scaling coefficients, ($\alpha$, $\beta$, $\gamma$) are rotation angles, and ($\Phi$, $\theta$) are gantry angles. The matrix G is used in order to compensate for the x and y gantry tilt angle adjustment of certain medical scanners.

Matrix $M_{fwd}$ represents a forward mapping of the three-dimensional volume array onto the coordinate system of a projection plane. In order to transform this two-dimensional projection plane into the coordinate system of the three-dimensional volume array, the inverse matrix form can be used:

$$M_{inv} = M_{fwd}^{-1} = \begin{bmatrix} ixu & ixv & ixw & 0 \\ iyu & iyv & iyw & 0 \\ izu & izv & izw & 0 \\ itu & itv & itw & 1 \end{bmatrix} \quad (7)$$

where $M_{inv}$ is the inverse of matrix $M_{fwd}$, and can be used as the transformation matrix for the MPR image plane of an oblique cross-section at any arbitrary angle, scale and position as specified by the user.

Transformation of the [x,y] coordinates of the MPR image plane into [x',y',z'] coordinates of the three-dimensional volume array is accomplished using the following equation:

$$[x'\ y'\ z'\ 1] = [x\ y\ 0\ 1]\times \quad (8)$$

$$M_{inv} = [x\ y\ 0\ 1]\times \begin{bmatrix} ixu & ixv & ixw & 0 \\ iyu & iyv & iyw & 0 \\ izu & izv & izw & 0 \\ itu & itv & itw & 1 \end{bmatrix}$$

In an exemplary embodiment, the computation of [x',y',z'] coordinates is performed incrementally. More specifically, the matrix coefficients of equation (7) are used directly in order to compute [x',y',z'] coordinates instead of transforming each [x,y] coordinate with a matrix multiplication as in equation (8). The translation coefficients itu, itv, itw can be used as the coordinates of the origin of the oblique plane. The start point of each scan line can be computed by adding the coefficients iyu, iyv, iyw incrementally to the origin of the oblique plane. Each successive point along a scan line can be computed by adding the coefficients ixu, ixv, ixw incrementally to the start point of each scan line. FIG. 2 illustrates how the [x,y] coordinates on an MPR image are transformed into [x',y',z'] coordinates of an MPR plane, which is positioned through a volume in order to compute the MPR image of an oblique cross-section.

The object-order MPR method disclosed herein is not limited to planar oblique planes, but can also be used with curved oblique planes, where a series of [x,y] coordinates defining a two-dimensional curve can be transformed using equation (8), and then extruded along a third axis incrementally using the izu, izv, izw coefficients of equation (8).

Equation (8) computes the transformed [x',y',z'] coordinates from [x,y] coordinates of the image plane, and shows MPR to be image-order dependent. This image-order dependency causes very inefficient arbitrary memory access to slices in the three-dimensional volume array. There is no way to know a-priori what the value of z' is going to be, and therefore the slices of the three-dimensional array are accessed in arbitrary order. If the oblique plane crosses the volume with an orientation orthogonal to the slices, each slice is visited numerous times while traversing the coordinates of each image scan line. This limitation is depicted in FIG. 4, where a low-resolution 2D representation of the volume and of the oblique plane is used for sake of simplicity. Note how the seven samples of the first or upper scan line traverse the slices 423, 424, 425, 426 of the volume, and then the samples of the adjacent scan line traverse slices 423, 424, 425, 426 once again.

Embodiments of the present disclosure remove the limitation of such image-order dependency by processing the [x,y] pixels of the image plane based on the progressive order of the volume slices, thereby implementing an object-order method. The slice index iz of an [x',y',z'] coordinate can be easily computed by taking the integer part of z':

$$iz=\text{int}(z') \quad (9)$$

There are several advantages in using an object-order method: a computer apparatus could load volume slices in memory sequentially, and perform tri-linear interpolation using only two adjacent slices in memory (slice iz and slice iz+1). Slices could be loaded into memory sequentially, and after all the samples associated with a slice pair have been interpolated, the slices could be progressively unloaded from memory. A low-cost computer using an object-order MPR algorithm could compute cross-sections of volumes with an arbitrary number of slices (even several thousands of them), because all it is needed is enough memory to store two slices at any time.

In order to rearrange image-order coordinates into object-order, the present disclosure introduces a Sorting Device between the [x',y',z'] coordinate generation step and the tri-linear interpolation step. The minimum requirement for such a Sorting Device is to rearrange and sort [x',y',z'] coordinates according to the progressive ordering of slices in the three-dimensional array. In an extended implementation of such device, the scan lines of each slice as well as the pixels in each scan line are also sorted in progressive order. After the sorting operation is completed, the interpolation of the MPR image can be executed in object-order rather than in image-order. FIG. 4 depicts a block diagram of the herein described object-order MPR method. The sorting device may comprise special purpose high-speed integrated circuit chips to perform the reordering of the coordinates; or it may be implemented by a programmed computer, with either a serial processor or parallel processors.

In a preferred embodiment of the present disclosure, the sorting device is implemented by a programmed computer, which reorders the [x'y'z'] coordinates progressively using linked-list structures. More specifically, a list called NodeList is allocated, containing as many elements as the total number of pixels in the MPR image. Each element of such list is called a "Node", and stores the following information: an [x,y] offset into the MPR image plane, the corresponding transformed [x',y',z'] coordinate value, and a nodeLink variable containing a link to another Node in the list. The sorting step consists in storing each computed [x,y] and [x',y',z'] values in a Node, and then link together Node elements which have the same integer part value of z' (i.e. Nodes having the same value of iz). In order to create a linked list of Node elements belonging to a particular slice, a list called BinList is allocated, containing as many elements as the total number of slices. Each element of such list is called a "Bin", and stores the following information for each slice: a firstNode link to the first Node having the corresponding iz slice index, and a lastNode link to the last Node added to the linked list of Nodes for the corresponding iz slice index. While each [x,y] coordinate of the MPR image is traversed, the [x',y',z'] coordinates are computed and a new Node element from NodeList is filled with the current coordinate values. The value of iz is computed by taking the integer part of z', and it is used as an index to locate a Bin element in BinList corresponding to slice iz. If the Bin element has never been initialized before, its firstNode and lastNode links are initialized to the current Node, which becomes the first Node of a linked list of Nodes for a specific iz value. If the Bin element was initialized before, the Node pointed to by the lastNode element of the Bin is linked to the current Node, and the lastNode link is set to the current Node. After all [x,y] coordinates have been traversed, BinList will hold a series of variable length linked-lists of Nodes for each slice. This reordering process is illustrated in FIGS. 5a and 5b, where a series of disjointed Nodes depicted in FIG. 5a is progressively linked in slice order, as depicted in FIG. 5b. One exemplary implementation embodiment is shown in the following pseudo-code listing:

```
allocate NodeList[number of pixels in MPR image]
allocate BinList[number of slices in volume]
set all listOfBins elements to zero
line.setPosition(itu, itv, itw)
nodeIndex = 0
for y = 0 to image.height-1
    point.setPosition(line.x, line.y, line.z)
    for x = 0 to image.width-1
        if(point is inside valid array boundaries)
            NodeList[nodeIndex].setCoordinate3D(point)
            NodeList[nodeIndex].setCoordinate2D(x,y)
            NodeList[nodeIndex].nodeLink = 0
            iz = int(point.z)
            if(BinList[iz] is empty)
                BinList[iz].firstNode = link to (NodeList[nodeIndex])
                BinList[iz].lastNode = link to (NodeList[nodeIndex])
            else
                previousNode = BinList[iz].lastNode
                previousNode.nodeLink = link to (NodeList[nodeIndex])
                BinList[iz].LastNode = link to (NodeList[nodeIndex])
            endIf
            nodeIndex = nodeIndex + 1
        endIf
        point.setPosition(point.x + ixu, point.y + ixv, point.z + ixw)
    next x
    line.setPosition(line.x + iyu, line.y + iyv, line.z + iyw)
next y
```

This pseudo-code implements the image-order computation of [x',y',z'] coordinates of an oblique planar cross-section and the progressive object-order sorting using linked-list structures. As an additional optimization, if any of the transformed coordinates fall outside the range of the three-dimensional volume array, they are discarded and do not get stored in the sorted linked-list structure.

After the sorting device has sorted the coordinates in object-order, the sorted coordinates are traversed in a slice-by-slice fashion, and tri-linear interpolation is performed using values from the current slice and its neighboring slice. The [x',y'z'] coordinates stored in each Node are separated into integer and fractional parts [ix,iy,iz] and [fx, fy, fz]:

$$[ix\ iy\ iz] = [\text{int}(x')\text{int}(y')\text{int}(z')]$$

$$[fx\ fy\ fz] = [\text{frac}(x')\text{frac}(y')\text{frac}(z')] \quad (10)$$

where int(n) represents the integer part of n (i.e. the part before the decimal point), and frac(n) represents the fractional part of n (i.e. the part after the decimal point). In prior art, the integer [ix,iy,iz] values are used as offsets into the three-dimensional volume array. This imposes the limitation of having random access to any data value in the three-dimensional array, which in programmed computers limits the size of the array to the maximum number of addressable memory locations. The present disclosure removes such limitation by loading slices in memory only when they are needed, discarding them when the computer memory becomes saturated. Instead of addressing the data as a three-dimensional array, the data values are addressed as two-dimensional offsets [ix, iy] of two adjacent slices having an index of iz and iz+1, respectively. The iz slice index and the ix,iy offsets are used retrieve a neighborhood of eight variables V1 to V8 having the following value:

$$V1 = \text{pixel}[ix,iy] \text{ of slice } iz$$

$$V2 = \text{pixel}[ix+1,iy] \text{ of slice } iz$$

$$V3 = \text{pixel}[ix,iy+1] \text{ of slice } iz$$

$$V4 = \text{pixel}[ix+1,iy+1] \text{ of slice } iz$$

$V5 = \text{pixel}[ix, iy]$ of slice $iz+1$        (11)

$V6 = \text{pixel}[ix+1, iy]$ of slice $iz+1$ $V7 = \text{pixel}[ix, iy+1]$ of slice $iz+1$ $V8 = \text{pixel}[ix+1, iy+1]$ of slice $iz+1$ If any of the slice and pixel offsets specified in equation (11) fall outside the range of the three-dimensional volume array, the corresponding value is set to zero. The data value V of an image pixel at coordinates [x,y] of the MPR image plane can be computed using tri-linear interpolation of the corresponding V1–V8 voxel values, using the fractional coordinates [fx, fy, fz] as follows:

$$A = V1 + fx*(V2-V1)$$

$$B = V3 + fx*(V4-V3)$$

$$C = V5 + fx*(V6-V5)$$

$$D = V7 + fx*(V8-V7)$$

$$E = A + fy*(B-A) \quad\quad (12)$$

$$F = C + fy*(D-C)$$

$$V = E + fz*(F-E)$$

pixel[x,y] of MPR image=V

In the preferred implementation of the present disclosure, the MPR image pixels are first initialized to zero. Each element of BinList is examined sequentially, and if the value of firstNode is not zero, the corresponding Node structure is retrieved. The information stored in the Node structure is used to determine which two slices are needed in memory, and tri-linear interpolation is performed using equations (10) through (12). Then the nodeLink variable of Node is examined, and if it is not zero, the corresponding linked Node is retrieved and the interpolation step is repeated until all linked Nodes of a particular Bin have been used. One implementation of the object-order traversal of the linked-list structures is shown in the following pseudo-code listing:

```
initialize all MPR pixel values to zero
for every slice z in the volume
    currentNode = BinList[z].firstNode
    while currentNode is not zero
        MPRimage.pixelValue(currentNode.coordinate2D) =
            interpolate(currentNode.coordinate3D)
        currentNode = currentNode.nodeLink
    end while
next z
```

This linked-list traversal for a specific Bin guarantees that all the samples requiring a specific pair of slices for tri-linear interpolation will be computed before moving to a new pair of slices. The interpolation process continues until every linked-list of Nodes of every Bin has been traversed and processed in object-order.

Embodiments of the present disclosure provide a method of the type initially described wherein an image of an oblique cross-section (i.e., an MPR image) can be efficiently computed, even when the entire three-dimensional array containing the data being interpolated is extremely large and exceeds the memory storage and memory addressing capabilities of the processing apparatus.

In exemplary embodiments, the set of transformed image-order coordinates necessary for the computation of an oblique cross-section are rearranged by a sorting device, which generates a list of coordinates sorted according to the progressive order of the slices in the three-dimensional data. The sorted coordinates are then traversed in object-order, allowing the processing apparatus to require only a minimum amount of memory for the storage and addressing of two slices, thereby reducing the overall cost of the processing apparatus and allowing such processing apparatus to compute oblique cross-sections of very large three-dimensional arrays containing thousands of slices.

Thus, an advantage of object-order processing is that the parallel slices of the object are traversed progressively, one at a time, and interpolated using slice pairs. Therefore, the storage memory requirements of any apparatus used for computing the oblique cross-section can be greatly reduced, because only two slices need to reside in memory at any time, and each slice is loaded in memory only once. Thus, the low memory requirements of the disclosed object-order method permit a simple processing apparatus or programmed computer with limited memory to compute oblique cross-sections of very large three-dimensional volumes containing an arbitrarily large number of slices.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for object-order reformatting of a volume comprising a plurality of slices, the method comprising:
   transforming coordinates of an oblique surface through the volume from image-order to object-order;
   traversing the slices in accordance with the object-order of the transformed coordinates; and
   interpolating voxel values of a pair of adjacent slices to render pixel values for an image of the oblique surface.

2. A method as defined in claim 1, further comprising:
   visualizing at least one of the plurality of interpolated pixels in the order in which it was rendered.

3. A method as defined in claim 1 wherein the plurality of slices corresponds to a medical image.

4. A method as defined in claim 1 wherein the oblique surface is a planar oblique plane.

5. A method as defined in claim 1 wherein the oblique surface is a curved oblique plane.

6. A method as defined in claim 1 wherein transforming coordinates comprises sorting the coordinates from image-order to object-order.

7. A system (100) for object-order reformatting of a volume comprising a plurality of slices, the system comprising:
   a coordinate transformation unit (170) for transforming coordinates of an oblique surface through the volume from image-order to object-order;
   an object-order slice traversal unit (180) for traversing the slices in accordance with the object-order of the transformed coordinates; and
   a slice-pair interpolation unit (190) for interpolating voxel values of a pair of adjacent slices to render pixel values for an image of the oblique surface.

8. A system (100) as defined in claim 7 wherein the plurality of slices comprise medical images.

9. A system (100) as defined in claim 7, further comprising:
   a CPU (102) in signal communication with said object-order slice traversal unit (180) for processing slices.

10. A system (100) as defined in claim 9, further comprising:
    a display adapter (110) in signal communication with the CPU (102) for displaying the image of the oblique plane; and
    an I/O adapter (112) in signal communication with the CPU (102) for recalling the locations of the voxels visualized from the image of the oblique plane to provide an indication of the location of a visualized object within the image of the oblique plane.

11. A system (100) as defined in claim 9, further comprising:
    a user interface adapter (114) in signal communication with the CPU (102) for at least receiving a selection decision for at least one image of the oblique plane from a user.

12. A system for object-order reformatting of a volume comprising a plurality of slices, the system comprising:
    transforming means for transforming coordinates of an oblique surface through the volume from image-order to object-order;
    traversing means for traversing the slices in accordance with the object-order of the transformed coordinates; and
    interpolating means for interpolating voxel values of a pair of adjacent slices to render pixel values for an image of the oblique surface.

13. A system as defined in claim 12, further comprising:
    visualization means for visualizing at least one of the plurality of interpolated pixels in the order in which it was rendered.

14. A system as defined in claim 12 wherein the plurality of slices correspond to medical images.

15. A system as defined in claim 12 wherein the oblique surface is a planar oblique plane.

16. A system as defined in claim 12 wherein the oblique surface is a curved oblique plane.

17. A system as defined in claim 12 wherein said transforming means comprises sorting means for sorting the coordinates from image-order to object-order.

18. A program storage device readable by machine, tangibly embodying a program of instructions executable by the machine to perform method steps for object-order reformatting of a volume comprising a plurality of slices, the method steps comprising:
    transforming coordinates of an oblique surface through the volume from image-order to object-order;
    traversing the slices in accordance with the object-order of the transformed coordinates; and
    interpolating voxel values of a pair of adjacent slices to render pixel values for an image of the oblique surface.

19. A program storage device as defined in claim 18, the method steps further comprising:
    visualizing at least one of the plurality of interpolated pixels in the order in which it was rendered.

20. A program storage device as defined in claim 18 wherein the plurality of slices correspond to medical images.

* * * * *